United States Patent
Onur et al.

(10) Patent No.: US 8,184,720 B2
(45) Date of Patent: May 22, 2012

(54) OPTIMAL VIDEO ADAPTATION FOR RESOURCE CONSTRAINED MOBILE DEVICES BASED ON SUBJECTIVE UTILITY MODELS

(75) Inventors: Ozgur Deniz Onur, Ankara (TR); A. Aydin Alatan, Ankara (TR)

(73) Assignee: Tubitak Biltien, Ankara (TR)

( * ) Notice: Subject to any disclaimer, the term of this patent is extended or adjusted under 35 U.S.C. 154(b) by 1173 days.

(21) Appl. No.: 11/910,876

(22) PCT Filed: Apr. 11, 2005

(86) PCT No.: PCT/TR2005/000019
§ 371 (c)(1),
(2), (4) Date: Oct. 5, 2007

(87) PCT Pub. No.: WO2006/126974
PCT Pub. Date: Nov. 30, 2006

(65) Prior Publication Data
US 2008/0137755 A1    Jun. 12, 2008

(51) Int. Cl.
*H04N 7/12*    (2006.01)
(52) U.S. Cl. .................... 375/240.26; 375/240; 348/180
(58) Field of Classification Search ........................ None
See application file for complete search history.

(56) References Cited

U.S. PATENT DOCUMENTS
7,558,320 B2 *    7/2009    Winder et al. ........... 375/240.12

OTHER PUBLICATIONS

Optimal Video Adaptation for Resource Constrained Mobile Devices Based on Utility a Thesis Submitted to the Graduate School of Natural and Applied Sciences of the Middle East Technical University by Ozgur Deniz Onur, Sep. 2003.*

* cited by examiner

*Primary Examiner* — Ricky Ngo
*Assistant Examiner* — David Oveissi
(74) *Attorney, Agent, or Firm* — Venable, Campillo, Logan & Meaney PC

(57) ABSTRACT

The invention relates to using the properties of the mobile client terminal, preferably data processing capability and the screen size, and the capacity of the communication channel between the video streaming server and the client terminal, to determine the bit rate, frame rate and the spatial resolution that the multimedia data, preferably video, needs to be encoded with in order to provided the end user with the maximum possible subjective user satisfaction. The invention also pertains to sending the multimedia data coded with the determined parameters to the client terminal using a video transcoder and a streaming server.

26 Claims, 4 Drawing Sheets

OPTIMAL VIDEO ADAPTATION FOR RESOURCE CONSTRAINED MOBILE DEVICES BASED ON SUBJECTIVE UTILITY MODELS

TECHNICAL FIELD

The invention relates to modeling the satisfaction a user gets from viewing multimedia data (audio, image, video etc.) on a resource limited device by using utility theory and determining the optimal video coding parameters that will result in the maximum user viewing satisfaction.

BACKGROUND ART

Recent developments in networking technology have allowed delivery of digital data through wired/wireless networks with bandwidths that are large enough to accommodate delivery of rich multimedia data to end terminals. The mobile device manufacturers in turn, have developed terminals that can gracefully handle the multimedia content. However, a unified multimedia processing architecture for the mobile terminals does not exist and the mobile market accommodates diverse terminals having significantly different resource handling capabilities. This diversity necessitates the tailoring of the content according to the capabilities of the individual terminals. While it is possible to author content for a specific class of devices such as the PDA's or mobile phones, adapting the content individually for each user terminal results in higher user satisfaction. Such a dynamic adaptation scheme also accounts for the possible changes of state of a user terminal. The state of a user terminal can vary frequently, for instance as the end-user changes his physical location, the networks and the transmission channels that the mobile terminal accesses also change. Then the environmental conditions and the user preferences need to be re-evaluated to provide the user with a better multimedia experience.

Various methodologies have been proposed that deal with the problem stated above. A fundamental step towards the solution of the problem is to determine, in a methodical way, the attributes of the multimedia data that make it an ideal candidate to provide maximum user satisfaction. There exist three main approaches for evaluating the quality of digital images and video in the literature;

1. Methods utilizing objective metrics (MSE, PSNR)
2. Methods evaluating the satisfaction a user will get from viewing multimedia data using models of the Human Visual System (HVS)
3. Methods using utility values elicited from human subjects via subjective evaluation tests It should be emphasized that the methods mentioned above focus on the differences in the content, and the capabilities of the terminals at which the content is consumed is not considered. It is well known that objective metrics, such as PSNR or MSE, are highly uncorrelated with the human perception of quality. Furthermore, due to the extreme complexity of the HVS, a complete and precise HVS model that has been widely accepted does not yet exist. As a result, utilizing subjective tests to evaluate video quality is still accepted to be the most accurate way of modeling human responses. Nevertheless, this approach is tedious and expensive. The dependency of the results on the testing environment, as well as the experience and motivation of the human subjects is another issue that needs to be considered when using this methodology.

Methods that Utilize Utility Functions or Similar Constructs to Model User Viewing Satisfaction Also Exist:

Among the known techniques is a system to adapt multimedia web content to match the capabilities of a requesting device introduced in R. Mohan, J. R. Smith, and C.-S. Li, "*Adapting Multimedia Internet Content for Universal Access*," IEEE TRANSACTIONS ON MULTIMEDIA, VOL. 1, NO. 1, MARCH 1999. The system involves an InfoPyramid, which creates and stores multi-modal and multi-resolution representations of the multimedia content. Using this representation, a "customizer" selects the representation of the content from various available versions. Considering the diversity of the terminals that can be used to access multimedia content, an optimal representation for each different terminal cannot be obtained from a predetermined set of representations by using such a method.

The first reference to utility theory in the context of video adaptation appears in P. Bocheck, Y. Nakajima and S.-F. Chang, "*Real-time Estimation of Subjective Utility Functions for MPEG-4 Video Objects*," Proceedings of IEEE Packet Video Workshop (PV'99), New York, USA, April, 1999. The method, albeit mentioning the possible incorporation of the utility theory into the context of video adaptation, refrains from stating the details of how the method can be facilitated.

In a more theoretical approach, only a conceptual framework that models adaptation, as well as resource, utility and the relationships in between, are presented in S. F. Chang, "*Optimal Video Adaptation and Skimming Using a Utility-Based Framework*," Tyrrhenian International Workshop on Digital Communications (IWDC-2002) Capri Island, Italy September 2002. While objective measures, such as PSNR, coherence, temporal smoothness are used to measure utility, the optimal video adaptation problem is formulated as finding the adaptation operation that maximizes the utility of the adapted entity, given the original entity and resource constraints. However, the objective measures fail to model human satisfaction adequately. Hence, for obtaining an acceptably accurate model, a multitude of attributes need to be extracted from the video, and such a procedure significantly increases the computational complexity of the system.

A content-based utility function predictor is also proposed in Y. Wang, J.-G. Kim, S.-F. Chang, "*Content-Based Utility Function Prediction For Real-Time MPEG-4 Video Transcoding*," IEEE ICIP 2003, In this method, the system extracts compressed domain features in real time and uses content-based pattern classification and regression to obtain a prediction to the utility function. Nevertheless, the utility value, corresponding to a given adaptation of a video, is presented as a function of the video bit-rate, which contradicts the subjective nature of the utility concept.

Utility Theory strives to obtain the satisfaction that any given resource provides to the owner of the resource, as a function of the amount of that resource owned. Generally the relationship between the satisfaction and the amount of resource is highly subjective, i.e. might be different for each individual. The main function of Utility Theory in these types of problems is fitting an objective model to this subjective relation. When this is accomplished, the change in the user satisfaction as a result of a change in the amount of the resource can be calculated. Utility Theory is commonly employed in the fields of statistics, economics, and management. Particularly in games of fortune like the lotteries, various marketing and corporate strategy applications the theory has enjoyed wide spread popularity.

Some of the Methodologies that Employ Utility Theory in Practical Applications are Presented Below:

Patent application EP 1143380, pertains to predicting the decision of a consumer trying to make a selection among various alternatives, by using the decisions that the user or other users with similar behavior patterns have made in the past. The patent does not include the application of the proposed approach to a specific problem, and the method is discussed as a general decision making mechanism. Although the proposed approach is practical for simple formulations, it is not applicable to problems like modeling the satisfaction a user gets form watching a video clip where many variables having complex relationships with each other are involved.

Patent application GB2399195 pertains to a system that automatically assesses the performances of web sites. The users are separated into classes depending on their web site habits i.e. the total time they spend logged on to the site, the number of items they buy etc. An intelligent agent automatically imitates the behavior of a particular class of customers and interacts with the web site accordingly. The response of the web site to the interactions are recorded and input to a utility function. The value of the function is then used as a figure of merit for that site for the client class that is being tested. The proposed method is specialized for a particular application and is not suitable for determining the satisfaction a user gets from watching a video clip.

Patent application U.S. Pat. No. 6,484,152 relates to a system that chooses the best portfolio from a pool of stocks so as to meet the needs of each individual customer to the fullest extent possible. After collecting the necessary information such as the amount of money that will be invested, the risk that the customer is willing to take etc. the system uses utility functions to determine the optimum portfolio that will suit the needs of the customer. The method needs to elicit substantial amount of information from each individual user each time the system is used so it is not applicable to determining the utility of video clips.

In patent application U.S. Pat. No. 20,030,033,190, a system that determines if an on-line shopper is converted into a purchaser of an item as a result of promotions offered by an online vendor is proposed. A model partially based on regression and partially on utility theory is constructed using the customer profile, the log information, products currently on sale and the offered promotions. When the data corresponding to a new shopper is fed to the system, the percentage likelihood that s/he will be converted into a purchaser is calculated. The methodology is specifically designed for the online shopper problem and is not suitable for use in the utility formulation of satisfaction on watching video clips.

BACKGROUND OF THE INVENTION

The fundamental motive of utility theory is, to represent the satisfaction or expected utility of a resource, as a function of the amount of that resource. There are two methods to obtain the utility function of a resource in utility theory. Both of these methods rely on subjective utilities provided by individual(s) representing the community for which the utilities need to be determined. While one of the approaches requires eliciting the utility values directly from the individual by presenting the best and worst possible results and asking the individual to determine the relative satisfaction of all the remaining points of the utility function, the other approach assigns a specific shape (usually an exponential) to the utility function, such as $$U(x) = x^c \quad (1a)$$

$$U(x) = (1 - e^{-x/c}) \quad (1b)$$

where x stands for resources. In this case, the value of parameter c should be determined from the results of subjective tests. The parametric forms used for the formulation of utility can be significantly for different application domains, the above formulations are used frequently in economics and modeling games of chance. Utilization of this parametric method substantially decreases the number of points that need to be elicited from the tester in subjective experiments.

The results of subjective test can have significant variance depending on the ambient conditions, the experience and motivation of the testers etc. If the utility models are chosen to be simple functions of few variables, the variances that can be introduced as a result of the testing procedure can be significantly reduced. However, since the satisfaction a viewer gets from watching a video clip is a complex function of many different variables, the total satisfaction formula can not modeled with simple equations. Then it becomes necessary to decompose the overall utility into smaller pieces, and then in some way combine them to obtain the total satisfaction formulation.

AIM OF THE INVENTION

In one aspect, the invention provides a system to determine the parameters that multimedia data, preferably digital video, needs to be coded with so as to maximize the satisfaction of a user viewing the multimedia data on a resource limited device.

In one aspect, the invention provides a method to model the satisfaction a user gets from a watching multimedia data, preferably digital video, on a resource limited device as a function of the device parameters, coding parameters and the communication channel capacity using utility theory.

In yet another aspect, the invention provides a method to formulate the total user satisfaction as a linear combination of simple independent utility functions onto which utility models can be fitted using the results of subjective evaluation experiments.

DPC The data processing capacity of the terminal device that the multimedia data will be consumed on
CSR The spatial resolution that the multimedia data is coded with
CBR The bit rate that the multimedia data is coded with
CFR The frame rate that the multimedia data is coded with
$C_1$ The expression indicating the rate of change of crispness utility
FR The parametric expression that determines the frame rate at which the client terminal is no longer able to decode the video in real time
$Sm_0$ The parametric expression that indicates the rate of change of motion smoothness utility for the cases where the frame rate is less than FR
$Sm_1$ The parametric expression that indicates the rate of change of motion smoothness utility for the cases where the frame rate is less than FR
Screen Size The screen size of the terminal device that the multimedia data will be consumed on, in pixels
$S_1$ The parametric expression that indicates the rate of change of content visibility utility for the cases where the multimedia data resolution is less than the screen size
$S_2$ The parametric expression that indicates the rate of change of content visibility utility for the cases where the multimedia data resolution is greater than the screen size

DETAILED DESCRIPTION

Digital receivers, DVD players, and video recorders produce high quality video. These videos need to be adapted according to the resource capabilities of the mobile devices and the intermediate communication channel to enable the consumption of this content on resource limited devices.

Figure 1:
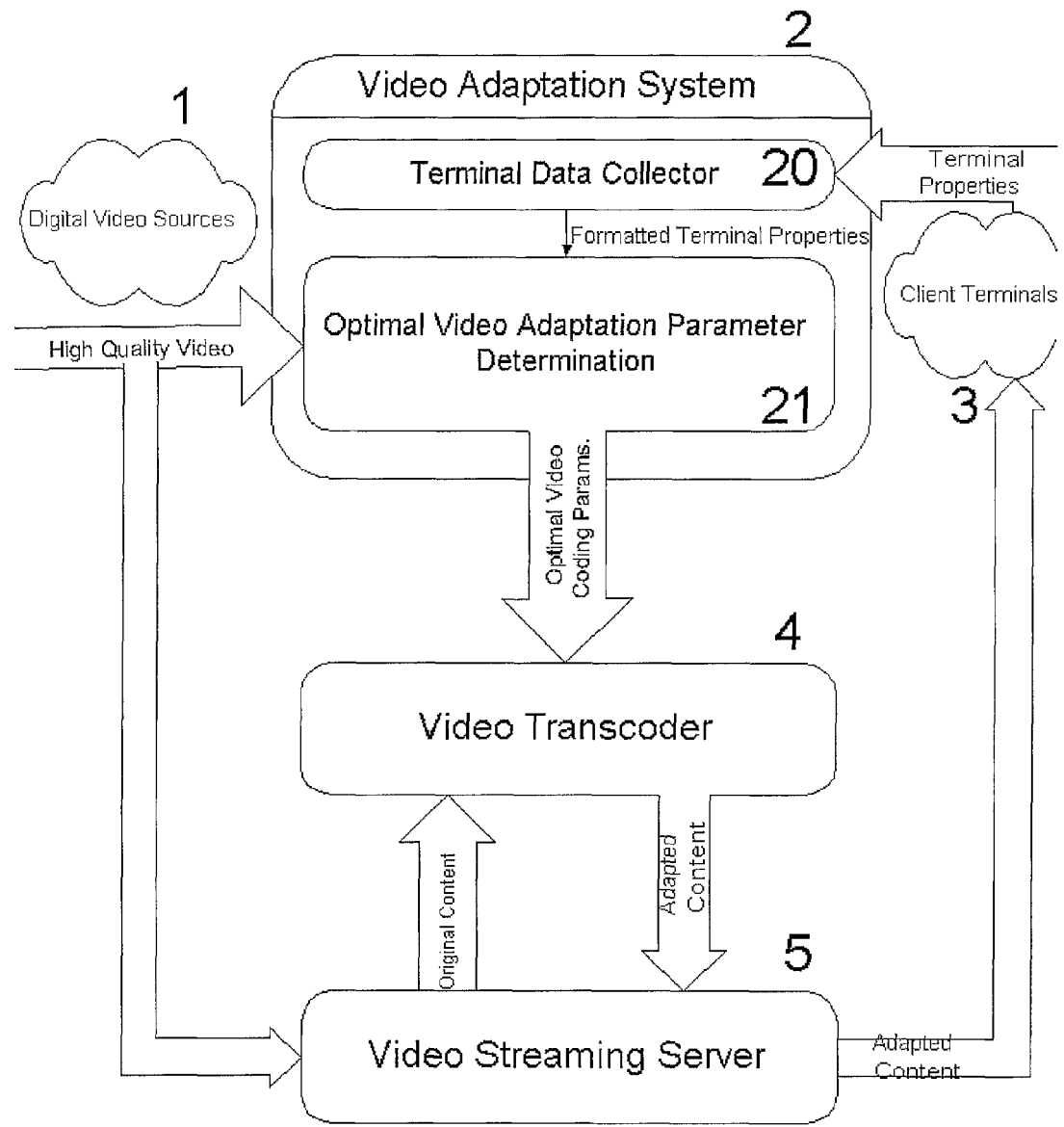
FIG. 1. An exemplary embodiment of the proposed method
FIG. 2. Flowchart of video adaptation system
FIG. 3. An exemplary utility function plot
FIG. 4. Decomposition of the user satisfaction into component utilities The details in the figures are also labeled, and a brief description of the labels are given below
1. Digital Video Sources
2. Video Adaptation System
3. Client Terminals
4. Video Transcoder
5. Video Streaming Server
20. Terminal Data Collector
21. Optimal Video Adaptation Parameter Determination
210. Obtain Component Utilities Specific to the User Terminal
220. Decompose the User Satisfaction into Component Utilities
230. Obtain the Formula of the Utility Function for the Crispness
231. Obtain the Parameters in the Crispness Formulation Using Subjective Tests
240. Obtain the Utility Function for the Motion Smoothness Utility
241. Obtain the Parameters in the Motion Smoothness Formulation Using Subjective Tests
250. Obtain the Utility Function for the Content Visibility Utility
251. Obtain the Parameters in the Content Visibility Formulation Using Subjective Tests
260. Combine Component Utilities in Accordance with User Preferences
270. Obtain the Pareto Optimal Solution Set
271. Discard the Solutions Exceeding the Channel Capacity 272. Determine the Weighting Factors for Component Utilities
280. Determine the Weighting Factors for Component Utilities
281. Optimize the Additive Utility Function using Simulated Annealing Acronyms and Definitions are given below.

In the embodiment depicted in FIG. 1, videos produced by the digital video sources (1) are sent simultaneously to a video streaming server (5) and a video adaptation system (2). The optimum video adaptation parameter determination module (21) in the video adaptation system (2), determines the coding parameters that the multimedia data needs to be coded with in order to provide maximum user satisfaction while being watched on the terminal (3) whose data processing capability is determined by the terminal data collector (20). The obtained coding parameters are sent to a video transcoder (4). The transcoder (4) transcodes the multimedia data that it obtains from the video streaming server and sends the data coded with parameters that will maximize the subjective user satisfaction back to the streaming server (5). Finally the video streaming server (5) streams the video to the client terminals (3).

The invention relates to a system that determines the parameters that the multimedia data needs to be coded with in order to provide the end user with the highest possible subjective satisfaction, that is provide the best user experience given the client terminal (3) that the data will be consumed on, and the capacity of the communication channel between the video streaming server (5) and the client terminal (3).

That is using the properties of the mobile client terminal preferably data processing capability and the screen size and the capacity of the communication channel between the video streaming server and the client terminal, the system proposed by the invention determines the bit rate, frame rate and the spatial resolution that the multimedia data preferably video that is provided by a video streaming server needs to be encoded with in order to provide the end user with the maximum possible subjective user satisfaction.

In the video adaptation system shown in FIG. 1, the algorithms pertaining to the invention are shown in the sub-system "Optimal Video Adaptation Parameter Determination" (21). The other sub-systems that are required to stream the adapted content to the user terminal "Terminal Data Collector" (20) and the "Video Transcoder" (22) have been implemented in video adaptation literature and the proposed invention can be used in conjunction with any one of the available commercial implementations.

Figure 2:
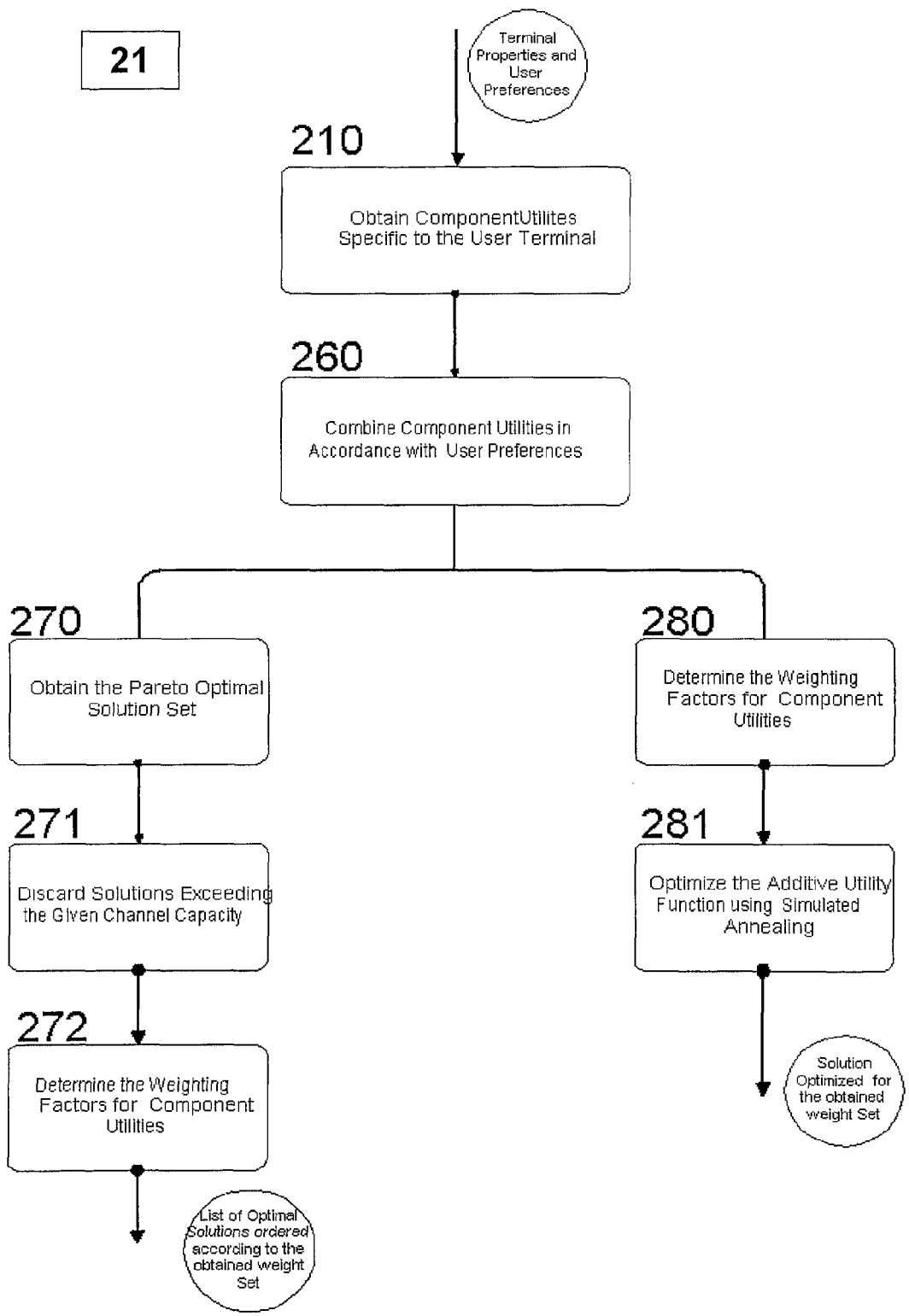

In FIG. 2, the steps that are followed in the subsystem "Optimal Video Adaptation Parameter Determination" (21) are presented. The details of each step are given below.

In FIG. 2, the subsystem "Obtain Component Utilities Specific to the User Terminal" (210) constructs the specific utility functions that must be used to determine the video coding parameters that the multimedia data needs to be coded with in order to maximize the subjective user satisfaction for the given user terminal and the communication channel capacity. The details of the procedure are presented in FIG. 4.

In "Obtain Component Utilities Specific to the User Terminal" (210) the overall user satisfaction is decomposed into simpler distinct satisfactions which are in turn modeled using utility functions. The sub-utilities are modeled using the parametric utility functions forms in (1a), (1b) and/or their combinations. These models are constructed using the video coding parameters (CBR, CFR, CSR) and the terminal processing capabilities. The decomposition of the total utility into simpler sub-utilities increases the reliabilities of the subjective tests and decreases the dependency of the results on the testers and the ambient conditions of the test environment. These subjective tests are used to determine the parameters of the component utility formulations for given terminal characteristics.

In "Obtain Component Utilities Specific to the User Terminal" (210), the total satisfaction is modeled as linear combinations of sub-utilities. The total utility is preferably formulated to comprise three component utilities. The component utilities are determined as Utility of Crispness, Utility of Motion Smoothness and Utility of Content Visibility. The reason for such decomposition is due to the perceptual independence of the proposed sub-objectives (video frames with very low distortion might be displayed in a non-smooth manner in time or a motion smooth video can independently have a very low spatial resolution) and the fact that such a decomposition spans all the aspects that can create user satisfaction or dissatisfaction.

In "Combine Component Utilities in Accordance with User Preferences" (260) presented in FIG. 2, the component utilities described above are combined to construct the overall utility function that models the total satisfaction. Two different methods are employed to obtain the overall satisfaction from the component utilities:

1. Obtaining the Pareto Optimal solution set
2. Forming a linear combination of sub-utilities using a set of coefficients (or weights)

For multiple criteria optimization problems, finding the pareto optimal solution set is often the first step towards obtaining the optimal solution. The pareto optimal set contains only the vectors for which it is not possible to find another solution vector having all the component utilities larger than the corresponding component utilities of the member vector. In other words the value of any one of the component utilities can not be increased without causing a decrease in the value of one of the other component utilities. The members of the pareto optimal set are called as non-dominated solutions.

In "Obtain the Pareto Optimal Solution Set" (270) presented in FIG. 2, the component utilities obtained in "Obtain Component Utilities Specific to the User Terminal" (210), the utility of crispness ($U_{crisp}$), the utility of motion smoothness ($U_{smooth}$) and the utility of content visibility ($U_{cv}$) are evaluated at each possible combination of the values (CBR, CFR, CSR). That is for every vector (CBR, CFR, CSR) a corresponding utility vector ($U_{crisp}$, $U_{smooth}$, $U_{cv}$) is obtained. From the set of obtained ($U_{crisp}$, $U_{smooth}$, $U_{cv}$) vectors, the ones having all three of its component utility values less than another element vector are discarded to obtain the pareto optimal set of utility vectors.

If the communication channel capacity is known, the members of the pareto optimal set that require the video to be coded at a bit rate higher than this capacity can be removed from the pareto optimal set of candidate solutions. In "Discard the Solutions Exceeding the Channel Capacity" (271), the members of the pareto optimal set requiring bit rates higher than the channel capacity are discarded to obtain a channel compatible reduced solution set which is a subset of the original pareto optimal solution set. The members of this set can be transmitted to the end user terminal through the band limited channel.

After obtaining the reduced solution set, it is necessary to determine a set of weighting vectors signifying the relative importance of each component utility for an end user, in order to be able to rank the members of the reduced solution set according the satisfaction they will provide and obtain the best solution. For this purpose in "Determine the Weighting Factors for Component Utilities" (272) the end user is asked to provide a weighting coefficient for each sub objective signifying the relative importance of each component utility. The end user chooses three coefficients between 0 and 1 inclusive ($w_1$, $w_2$, $w_3$) each corresponding to one of the component utilities ($U_{crisp}$, $U_{smooth}$, $U_{cv}$). After the end user determines all three coefficients the coefficients are normalized so that they sum up to unity.

Then using the normalized coefficients obtained above, for each component utility vector ($U_{crisp}$, $U_{smooth}$, $U_{cv}$) which is a member of the reduced solution set, a utility value is obtained by forming a weighted sum involving the coefficients and the component utilities. The values of (CBR, CFR, CSR) for which the weighted is maximum are used to encode the video that will be sent to the user terminal.

However obtaining the pareto optimal set for every user terminal that demands multimedia content is computationally expensive. If the multimedia data is to be sent over a high capacity communication channel a different method can be employed. In such a case the maximum value of the weighted sum of the component utilities can be obtained using an optimization algorithm.

Utility theory states that if the satisfaction on any one of the sub objectives is independent from the satisfaction on every other sub-objective, then an additive utility function can be used to calculate the total satisfaction.

$$\text{Total Satisfaction} = W_1 M_1 + W_2 M_2 + \ldots + W_n M_n \quad (2)$$

As previously stated, the satisfaction of the viewer on any one of the component utilities is independent form the satisfaction on every other component utility. For example a very crisp video can be displayed in a non motion smooth manner, or a video displaying perfectly smooth motion can be blurred or blocky. Therefore the total satisfaction of the user can be computed as the weighted sum of the component utilities.

$$U = W_1 U_{crisp} + W_2 U_{msooth} + W_3 U_{cv} \quad (3)$$

In (3) the weights determine the importance of the corresponding component utility in determining the total satisfaction. The selection of the weights depends on the application scenario and user preferences, that is universally valid weights yielding the optimum result for all problems simply does not exist. In "Determine the Weighting Factors for Component Utilities" (280), the end user is asked to choose three coefficients between 0 and 1 inclusive ($w_1$, $w_2$, $w_3$) each corresponding to one of the component utilities ($U_{crisp}$, $U_{smooth}$, $U_{cv}$). After the end user determines all three coefficients the coefficients are normalized so that they sum up to unity.

After the normalized weights are obtained, the additive utility function is completely specified. The global maximum of this function is determined by using the well known optimization algorithm simulated annealing in "Optimize the Additive Utility Function Using Simulated Annealing" (281). The global maxima point indicates the video coding parameters, Bit Rate, Frame Rate and the Screen Size that if used to code the video, maximize the user satisfaction on the client device under consideration.

Figure 3:
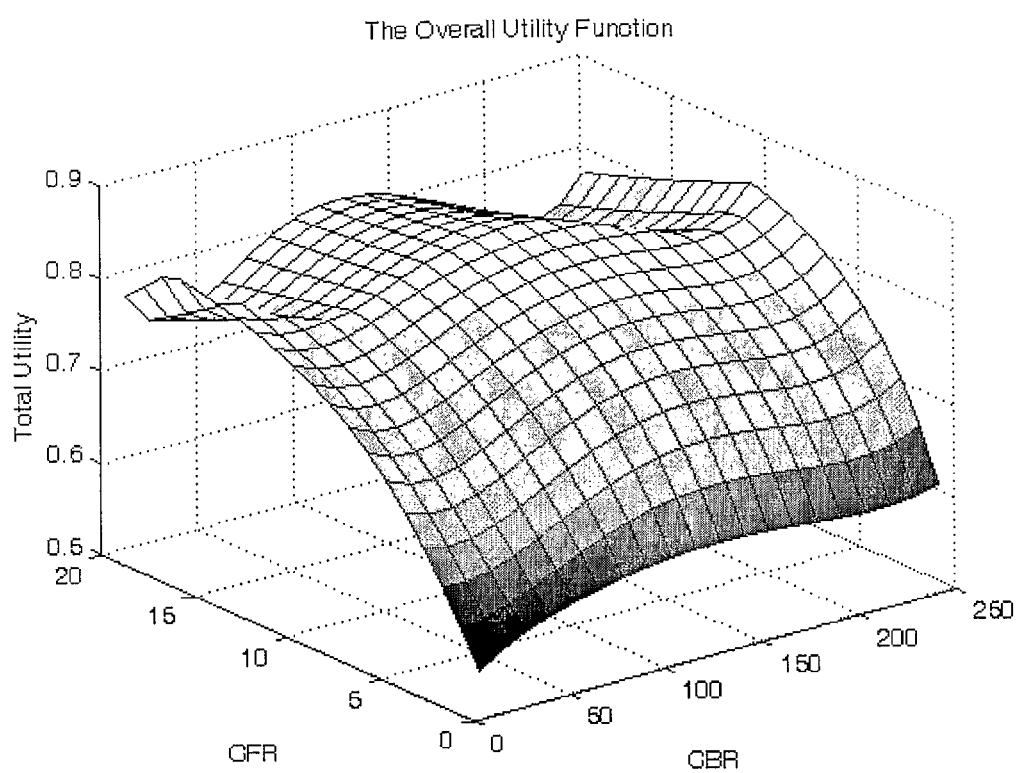

FIG. 3, shows the plot of the additive utility function for a specific set of weights as a function of bit rate and frame rate. The figure has been drawn for a constant spatial resolution of (176*144) for the sake of illustrating the utility function in a 3D plot. The figure shows the additive utility function for the weight set (w1, w2, w3)=(0.4, 0.5, 0.1). The peak point along the total utility axis corresponds to the CBR and CFR values that will provide the maximum subjective user satisfaction.

In the optimization literature, it has been proven that for every element of the pareto optimal solution set, a coefficient vector that yields a higher weighted sum when used with the given element than the sum it yields when used with any other element of the pareto optimal set can be found, and for every possible normalized coefficient vector a specific member of the pareto optimal set yields the highest weighted sum value. Then it can be asserted that maximizing the weighted sum obtained in "Determine the Weighting Factors for Component Utilities" (280) and "Optimize the Additive Utility Function Using Simulated Annealing" (281) is equivalent to obtaining the pareto optimal set and then finding the member of the pareto optimal set that yields the highest user satisfaction, for the weights employed in the additive utility formulation of "Determine the Weighting Factors for Component Utilities" (280).

The invention allows the determination of the video coding parameters that will result in maximum user satisfaction for a wide variety of user terminals and application scenarios.

Figure 4:
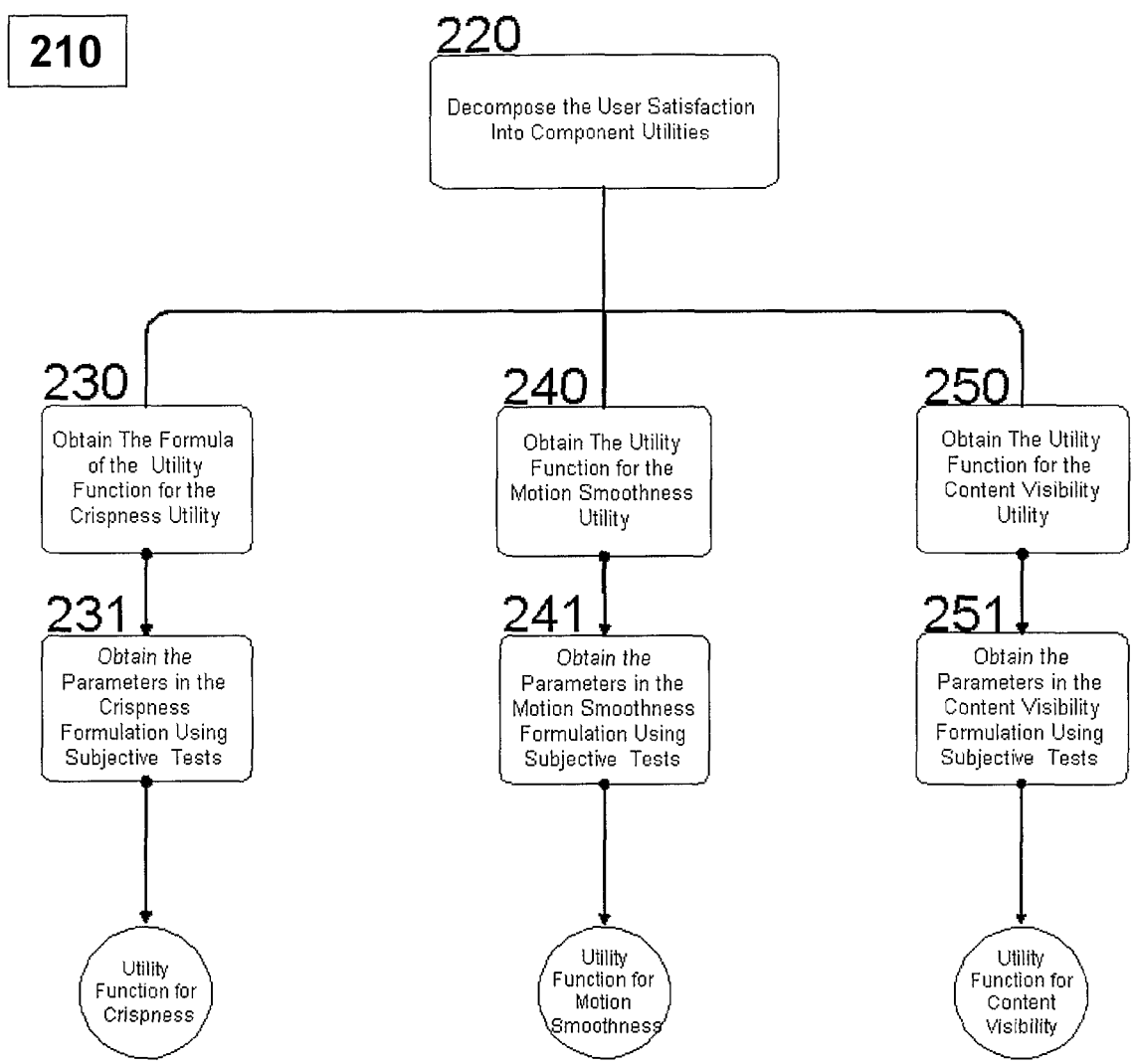

In FIG. 4 the details of the sub-system "Obtain Component Utilities Specific to the User Terminal" (210) are given. In "Decompose the User Satisfaction Into Component Utilities" (220) the total utility is decomposed into three component utilities, namely the utility of crispness, the utility of motion smoothness and the utility of content visibility.

Crispness, whose subjective nature enables it to be modeled by utility theory, is basically the perceptual similarity between the intensity edges in a digitized and compressed video, and the edges in a real-life scene, as perceived by a human viewer. Motion-smoothness is also another subjective phenomenon, indicating the perceptual similarity of temporal motion of an event in real world, and the motion observed through the succession of video frames. Finally, content visibility utility is simply related to the comprehensibility and visibility of the video content with respect to its resolution and the screen size of the terminal.

The most dominating parameter, affecting the crispness of a video, is the number of bits per pixel (bpp) for a fixed encoder performance (e.g. MPEG-1 encoder). In order to express the encoded bpp in terms of the coding parameters, the bit-rate needs to be normalized by both frame rate and spatial resolution. That is the bits/pixel value can be obtained as (bits/pixel)=(CBR/(CFR×CBR)). Perceived crispness of a video, increases substantially, as bpp value is increased. However, this increase reaches to saturation after a range of values for bpp is exceeded. This saturation is due to the inability of the HVS to discern the difference in crispness of a picture, resulting from increasing bpp value beyond a certain point.

In "Obtain the Formula of the Utility Function for the Crispness" (230), the formula of the utility of crispness expression is obtained as follows $$U_{crisp}(CBR, CSR, CFR) = 1 - e^{-c_1(CSR,CBR) \times \frac{CBR}{CFR \times CSR}} \quad (4)$$

In "Obtain the Parameters in the Crispness Formulation Using Subjective Tests" (231), the formulation for the c1 determining the slope of utility curve in (4) is obtained. C1 can be modeled in terms of CFR and/or CBR. The embodied sub-system "Obtain the Formula of the Utility Function for the Crispness" (230) uses a c1 formulation based only on CSR. To be able to obtain c1, a form needs to be assigned to it. For accurate modeling c1 should be modeled with quadratic expressions of third degree or higher, or a combination of exponential expressions. Then, the result of subjective evaluation expressions can be used to obtain the exact formula for the c1 expression.

In "Obtain the Parameters in the Crispness Formulation Using Subjective Tests" (231), $c_1$ that determines the rate of change of the exponential expression in Equation 4 is obtained. $C_1$ can be modeled in terms of CSR and/or CBR. In the embodiment in FIG. 4, a model of $c_1$ that only depends on CSR has been used. In order to obtain the expression for $c_1$ in terms of CSR and/or CBR, first of all Equation 4 is utilized to express $c_1$ as $$c_1(CSR, CBR) = \frac{CFR \times CSR}{CBR} \times \ln\left(\frac{1}{1 - U_{crisp}(CBR, CFR, CSR)}\right) \quad (5)$$

Subsequently, subjective tests with the Double Stimulus Impairment Scale (DSIS) method are performed according to the principles stated in ITU-R 500-11 "Subjective Television Picture Assessment" standard. In these tests the participants are requested to rate videos according to their subjective crispness for different values of (CBR, CFR, CSR). The results of the tests are normalized, and the mean opinion scores of the normalized results are used as the utility value of crispness for the videos that are being tested. Thus a set of (CBR, CFR, CSR) vectors and corresponding $U_{crisp}$ values are obtained.

In order to finally obtain $c_1$ in terms of CSR and/or CBR, $c_1$ is assigned an expression containing a polynomial of degree greater than 2 and optionally an exponential involving CSR and/or CBR. In an embodiment, a polynomial of third degree can be assigned to $c_1$ as indicated in Equation 6.

$$c_1(CSR, CBR) = a \times CSR^3 + b \times CSR^2 \times CBR + c \times CBR^2 + d \times CBR^3 \quad (6)$$

Then the (CBR, CFR, CSR) vectors with the corresponding $U_{crisp}$ values can be used for least squares fitting in order to find the values of a, b, c, d in Equation 6 that model the test results most accurately.

The motion smoothness of a video clip can be modeled as a function of CFR only, if the resource constraints of the user terminals are not taken into consideration. However, as stated before, the observed frame rate during playback in a user terminal will generally not be equal to the CFR, the coded frame rate at the video transcoder (4) due to resource limitations. Therefore, in "Obtain the Utility Function for the Motion Smoothness Utility" (240), the motion smoothness utility is modeled in terms of the CFR, CBR and the processing capability of the client device. Similar to the increase in crispness utility with increasing bpp, the motion smoothness utility increases up to a point in an exponential form with increasing CFR and then reaches to saturation. This saturation results from the inability of the client terminal to decode the video stream in real time after a certain frame rate is exceeded for a given bit rate.

In "Obtain the Utility Function for the Motion Smoothness Utility" (240), the motion smoothness utility is formulated as:

$$U_{smooth}(CFR, CBR, DPC) = \quad (7)$$
$$\begin{cases} 1 - e^{-sm_0(CBR,DPC) \times CFR} & , CFR \leq FR(CBR, DPC) \\ (1 - e^{-sm_0(CBR,DPC) \times FR(CBR,DPC)}) \times e^{-sm_1(CBR,DPC) \times (CFR - FR(CBR,DPC))} & , CFR > FR(CBR, DPC) \end{cases}$$

In Equation 7, DPC stands for the Data Processing Capability of the client terminal. DPC is preferably measured as the average of the integer and floating point operations that the device is capable of performing per second. It is possible to use different metrics such as the clock frequency of the central processing unit.

In "Obtain the Parameters in the Motion Smoothness Formulation Using Subjective Tests" (241), the following procedure is applied.

The frame rate at which the client terminal is no longer able to decode the video in real time is denoted by FR (CBR, DPC) in equation 7. In order to obtain the expression for FR, First of all subjective tests with the Double Stimulus Impairment Scale (DSIS) method are performed according to the principles stated in ITU-R 500-11 "Subjective Television Picture Assessment" standard. In these tests the participants are requested to rate videos according to their subjective motion smoothness for different values of (CBR, CFR). The results of the tests are normalized, and the mean opinion scores of the normalized results are used as the utility value of motion smoothness for the videos that are being tested.

Thus a set of values consisting of, the DPC value for the client terminal used in the tests, the (CBR, CFR) values which are used to encode the videos used in the tests, and corresponding $U_{smooth}$ values are obtained.

For every terminal with a distinct DPC value and for every video used in the test having some CBR value, the point at which the motion smoothness utility starts decreasing, that is the value of FR is calculated.

In order to finally obtain FR in terms of DPC and CBR, FR is assigned an expression containing a polynomial of degree greater than 2 and optionally an exponential involving DPC and CBR. In an embodiment, a polynomial of third degree can be assigned to FR as indicated in Equation 8.

$$FR(DPC,CBR) = a \times CBR^3 + b \times CSR^2 \times DPC + c \times CSR \times DPC^2 + d \times DPC^3 \quad (8)$$

Then the DPC, CBR and the corresponding $U_{smooth}$ values can be used for least squares fitting in order to find the values of a, b, c, d in Equation 8 that model the test results most accurately.

In Equation 7 $sm_0$ is the function that determines the rate of change of $U_{smooth}$ where the value of CFR is less than FR.

The first step to obtain $sm_0$, is to rewrite Equation 7 as $$sm_0(CBR, DPC) = \frac{1}{CFR} \times \ln\left(\frac{1}{1 - U_{smooth}(CBR, CFR, CSR)}\right) \quad (9)$$

Subsequently, subjective tests with the Double Stimulus Impairment Scale (DSIS) method are performed according to the principles stated in ITU-R 500-11 "Subjective Television Picture Assessment" standard. In these tests the participants are requested to rate videos according to their subjective motion smoothness for different values of (CBR, CFR). The results of the tests are normalized, and the mean opinion scores of the normalized results are used as the utility value of motion smoothness for the videos that are being tested.

Thus a set of values consisting of, the DPC value for the client terminal used in the tests, the (CBR, CFR) values which are used to encode the videos used in the tests, and corresponding $U_{smooth}$ values are obtained.

In order to finally obtain $sm_0$ in terms of DPC and CBR, $sm_0$ is assigned an expression containing a polynomial of degree greater than 2 and optionally an exponential involving DPC and CBR. In an embodiment, a polynomial of third degree can be assigned to $sm_0$ as indicated in Equation 10.

$$sm_0(CBR,DPC) = a \times CBR^3 + b \times CBR^2 \times DPC + c \times CBR \times DPC^2 + d \times DPC^3 \quad (10)$$

Then the DPC, CBR and the corresponding $U_{smooth}$ values can be used for least squares fitting in order to find the values of a, b, c, d in Equation 10 that model the test results most accurately. Thus a formula for $sm_0$ in terms of CBR and DPC is obtained.

In Equation 7 $sm_1$ is the function that determines the rate of change of $U_{smooth}$ where the value of CFR is greater than FR.

The first step to obtain $sm_1$, is to rewrite Equation 7 as $$sm_1(CBR, DPC) = \frac{1}{CFR - FR(CBR, DPC)} \times \left[\begin{array}{c}\ln(1 - e^{-sm_0(CBR,DPC) \times FR(CBR,DPC)}) + \\ \ln\left(\frac{1}{U_{smooth}(CBR, CFR, CSR)}\right)\end{array}\right] \quad (11)$$

Subsequently, subjective tests with the Double Stimulus Impairment Scale (DSIS) method are performed according to the principles stated in ITU-R 500-11 "Subjective Television Picture Assessment" standard. In these tests the participants are requested to rate videos according to their subjective motion smoothness for different values of (CBR, CFR). The results of the tests are normalized, and the mean opinion scores of the normalized results are used as the utility value of motion smoothness for the videos that are being tested.

Thus a set of values consisting of, the DPC value for the client terminal used in the tests, the (CBR, CFR) values which are used to encode the videos used in the tests, and corresponding $U_{smooth}$ values are obtained.

In order to finally obtain $sm_1$ in terms of DPC and CBR, $sm_1$ is assigned an expression containing a polynomial of degree greater than 2 and optionally an exponential involving DPC and CBR. In an embodiment, a polynomial of third degree can be assigned to $sm_0$ as indicated in Equation 12.

$$sm_1(CBR,DPC) = a \times CBR^3 + b \times CBR^2 \times DPC + c \times CBR \times DPC^2 + d \times DPC^3 \quad (12)$$

Then the DPC, CBR and the corresponding $U_{smooth}$ values can be used for least squares fitting in order to find the values of a, b, c, d in Equation 10 that model the test results most accurately. Thus a formula for $sm_1$ in terms of CBR and DPC is obtained The utility of the content visibility of a video clip depends on two factors: Initial CSR of the video and the screen size of the user terminal. While the CSR of the video is smaller than the device screen size, the content visibility utility increases with increasing screen size. Obviously a video, being transmitted to a terminal, whose screen size is smaller than the CSR of this video, can only be viewed partially, i.e. either cropped or down sampled before being displayed on that device. The results of subjective tests show that this results in reduced user satisfaction.

In the embodiment "Obtain the Utility Function for the Content Visibility Utility" (250), content visibility utility is formulated as follows $$U_{CV}(CSR, Screensize) = \quad (13)$$

$$\begin{cases} 1 - e^{-s_1(CSR) \times CSR} & CSR \leq ScreenSize \\ s e^{-s_2(CSR) \times (CSR - Screensize)} & CSR > ScreenSize \end{cases}$$

In Equation (13), the functions $s_1$, $s_2$ are inversely proportional with the screen size. In "Obtain the Parameters in the Content Visibility Formulation Using Subjective Tests" (251), the following methodology is employed:

The first step to obtain $s_1$, is to rewrite Equation 13 for the case where the video resolution is greater than the screen size as $$s_1(CSR) = \frac{1}{CSR} \times \ln\left(\frac{1}{1 - U_{cv}(CSR, ScreenSize)}\right) \quad (14)$$

Subsequently subjective tests with the Double Stimulus Impairment Scale (DSIS) method are performed according to the principles stated in ITU-R 500-11 "Subjective Television Picture Assessment" standard. In these tests the participants are requested to rate videos coded with different values of CSR according to their subjective content visibility in different terminals having varying screen sizes. The results of the tests are normalized, and the mean opinion scores of the normalized results are used as the utility value of content visibility for the videos that are being tested.

Thus screen sizes in pixels for the client terminals used in the tests, the CSR values which are used to encode the videos, and corresponding $U_{cv}$ values are obtained.

In order to finally obtain $s_1$ in terms of CSR, $s_1$ is assigned an expression containing a polynomial of degree greater than 2 and optionally an exponential involving CSR. In an embodiment, a polynomial of third degree can be assigned to $s_1$ as indicated in Equation 15.

$$s_1(CSR) = a \times CSR^3 + b \times CSR^2 + c \times CSR + d \quad (15)$$

Then the CSR, screen size and the corresponding $U_{cv}$ values can be used for least squares fitting in order to find the values of a, b, c, d in Equation 15 that model the test results most accurately.

The constant s is obtained by evaluating the expression in Equation 13 at the screen resolution of the client terminal used for viewing the data, for the case where the multimedia data resolution is smaller than the screen size, that is $s=1-e^{-s_1(ScreenSize) \times ScreenSize}$.

To obtain $s_2$, is to rewrite Equation 13 for the case where the video resolution is greater than the screen size as $$s_2(CSR) = \frac{1}{CSR - ScreenSize} \times (\ln(s) - \ln(U_{cv}(CSR, ScreenSize))) \quad (16)$$

Subsequently subjective tests with the Double Stimulus Impairment Scale (DSIS) method are performed according to the principles stated in ITU-R 500-11 "Subjective Television Picture Assessment" standard. In these tests the participants are requested to rate videos coded with different values of CSR according to their subjective content visibility in different terminals having varying screen sizes. The results of the tests are normalized, and the mean opinion scores of the normalized results are used as the utility value of content visibility for the videos that are being tested.

Thus screen sizes in pixels for the client terminals used in the tests, the CSR values which are used to encode the videos, and corresponding $U_{cv}$ values are obtained.

In order to finally obtain $s_2$ in terms of CSR, $s_1$ is assigned an expression containing a polynomial of degree greater than 2 and optionally an exponential involving CSR. In an embodiment, a polynomial of third degree can be assigned to $s_2$ as indicated in Equation 17.

$$s_2(CSR) = a \times CSR^3 + b \times CSR^2 + c \times CSR + d \quad (17)$$

Then the CSR, screen size and the corresponding $U_{cv}$ values can be used for least squares fitting in order to find the values of a, b, c, d in Equation 17 that model the test results most accurately.

The system that employs subjective utility models for video adaptation to mobile device utilizing user preferences and client device capabilities is not limited to the preferred embodiment presented above. Any changes made on the system or the methodology that are presented should be considered within the extent of protection.

The invention claimed is:

1. A method for determining the video coding parameters that will maximize the subjective user satisfaction, comprising the steps of:

Using the processing capability and the screen size of the client terminal, the communication channel capacity and the user preferences to determine the frame rate, bit rate, and the spatial resolution of a video that will result in maximum subjective user satisfaction, Encoding the video with the determined parameters and sending the video to the client terminal and said method is characterized in that said method decomposing the user satisfaction into three satisfaction models as the user satisfaction on crispness, the user satisfaction on motion smoothness and the user satisfaction on content visibility;

said user satisfaction on crispness is modeled as a function of encoded bits per pixel which is obtained by dividing the bit rate to the multiplication of the frame rate and the spatial resolution;

said user satisfaction on motion smoothness is modeled as a function of video coded bit rate (CBR), coded frame rate (CFR) and the processing capacity of the user terminal (DPC);

said user satisfaction on content visibility is modeled as a function of the video resolution in pixels (CSR) and the screen size of the user terminal (Screen Size) and wherein said user satisfaction on crispness is modeled as a utility function using the coded bit rate (CBR), coded frame rate (CFR), coded spatial resolution (CSR) and a $c_1$ function depending on (CBR), and the said utility function being formulated as, $$U_{crisp}(CBR, CSR, CFR) = 1 - e^{-c_1(CSR) \times \frac{CBR}{CFR \times CSR}}.$$

2. The method according to claim 1, wherein said user satisfaction on crispness is modeled as a utility function using the coded bit rate (CBR), coded frame rate (CFR), coded spatial resolution (CSR) and a $c_1$ function depending on coded bit rate (CBR) and coded spatial resolution (CSR) and the said utility function being formulated as given, $$U_{crisp}(CBR, CSR, CFR) = 1 - e^{-c_1(CBR) \times \frac{CBR}{CFR \times CSR}}.$$

3. The method according to claim 2, wherein $c_1$ function comprises the steps of:

Obtaining $U_{crisp}$ values as the result of subjective test performed for different values of CBR, CFR, CSR with the Double Stimulus Impairment Scale (DSIS) Methodology according to the specification ITU-R 500-11 (Subjective Television Picture Assessment Standard);

Obtaining the expression for the unknown $c_1$ function in terms of CBR, CFR, CSR and $U_{crisp}$ using the model for user satisfaction on crispness;

Obtaining the values of $c_1$ by evaluating the expression obtained for $c_1$ in the previous step, for CBR, CFR, CSR and $U_{crisp}$ values; and Obtaining the $c_1$ function in terms of CBR and CSR by least squares fitting using CSR, CBR values and the $c_1$ values obtained in the previous step.

4. The method according to claim 1, wherein obtaining $c_1$ function comprises the steps of:

Obtaining $U_{crisp}$ values as the result of subjective test performed for different values of CBR, CPR, CSR with the Double Stimulus Impairment Scale (DSIS) Methodology according to the specification ITU-R 500-11 (Subjective Television Picture Assessment Standard);

Obtaining the expression for the unknown c.sub.1 function in terms of CBR, CFR, CSR and $U_{crisp}$ using the model for user satisfaction on crispness;

Obtaining the values of $c_1$ by evaluating the expression obtained $c_i$ in the previous step, for CBR, CFR, CSR and $U_{crisp}$ values; and Obtaining the $c_1$ function in terms of only CBR by least squares fitting using the CBR values and the $c_1$ values obtained in the previous step.

5. A method for determining the video coding parameters that will maximize the subjective user satisfaction, comprising the steps of:

Using the processing capability and the screen size of the client terminal, the communication channel capacity and the user preferences to determine the frame rate, bit rate, and the spatial resolution of a video that will result in maximum subjective user satisfaction, Encoding the video with the determined parameters and sending the video to the client terminal and said method is characterized in that said method decomposing the user satisfaction into three satisfaction models as the user satisfaction on crispness, the user satisfaction on motion smoothness and the user satisfaction on content visibility;

said user satisfaction on crispness is modeled as a function of encoded bits per pixel which is obtained by dividing the bit rate to the multiplication of the frame rate and the spatial resolution;

said user satisfaction on motion smoothness is modeled as a function of video coded bit rate (CBR), coded frame rate (CFR) and the processing capacity of the user terminal (DPC);

said user satisfaction on content visibility is modeled as a function of the video resolution in pixels (CSR) and the screen size of the user terminal (Screen Size) and wherein said user satisfaction on crispness is modeled as a utility function using the coded bit rate (CBR), coded frame rate (CFR), coded spatial resolution (CSR) and a $c_1$ function depending on (CSR), and the said utility function being formulated as, $$U_{crisp}(CBR, CSR, CFR) = 1 - e^{-c_1(CSR,CBR) \times \frac{CBR}{CFR \times CSR}}$$

and wherein obtaining $c_1$ function comprises the steps of:
  Obtaining $U_{crisp}$ values as the result of subjective test performed for different values of CBR, CFR, CSR with the Double Stimulus Impairment Scale (DSIS) Methodology according to the specification ITU-R 500-11 (Subjective Television Picture Assessment Standard);
  Obtaining the expression for the unknown $c_1$ function in terms of CBR, CFR, CSR and $U_{crisp}$ using the model for user satisfaction on crispness;
  Obtaining the values of $c_1$ by evaluating the expression obtained for $c_1$ in the previous step, for CBR, CFR, CSR and $U_{crisp}$ values; and
  Obtaining the $c_1$ function in terms of only CSR by least squares fitting using the CSR values and the $c_1$ values obtained in the previous step.

6. The method according to claims 5, 4 or 3, wherein said $c_1$ functions contain a polynomial expression of degree at least two.

7. The method according to claims 5, 4 or 3, wherein said $c_1$ functions contain an exponential expression.

8. A method for determining the video coding parameters that will maximize the subjective user satisfaction, comprising the steps of:
  Using the processing capability and the screen size of the client terminal, the communication channel capacity and the user preferences to determine the frame rate, bit rate, and the spatial resolution of a video that will result in maximum subjective user satisfaction,
  Encoding the video with the determined parameters and sending the video to the client terminal and said method is characterized in that
  said method decomposing the user satisfaction into three satisfaction models as the user satisfaction on crispness, the user satisfaction on motion smoothness and the user satisfaction on content visibility;
  said user satisfaction on crispness is modeled as a function of encoded bits per pixel which is obtained by dividing the bit rate to the multiplication of the frame rate and the spatial resolution;
  said user satisfaction on motion smoothness is modeled as a function of video coded bit rate (CBR), coded frame rate (CFR) and the processing capacity of the user terminal (DPC);
  said user satisfaction on content visibility is modeled as a function of the video resolution in pixels (CSR) and the screen size of the user terminal (Screen Size) and wherein said user satisfaction on smoothness is modeled as a utility function using the: The processing capacity of the user terminal (DPC); Coded frame rate (CFR) value; The FR (CBR, DPC) that determines the CFR at which the device will no longer be able to decode the video in real time as a function of CBR and DPC; $Sm_0$ function; $Sm_1$ function; and the said utility function being formulated as,

9. The method according to claim 8, wherein obtaining FR function comprises the steps of,
  Obtaining $U_{smooth}$ values as the result of subjective tests performed for different values of CBR, CFR with the Double Stimulus Impairment Scale (DSIS) Methodology according to the specification ITU-R 5009-11 (Subjective Television Picture Assessment Standard);
  For each CBR value that the test are performed with, obtaining the frame rate value at which the Usmooth values start decreasing, that is the value at which the device is unable to decode the video in real time, for a device with a given DPC; and
  Obtaining the FR function in terms of CBR and DPC by least squares fitting, using the CBR, DPC values and the frame rates obtained in the previous step.

10. The method according to claim 8, wherein obtaining $Sm_0$ function comprises the steps of
  Obtaining Usmooth values as the result of subjective tests performed for different values of CBR, CFR with the Double Stimulus Impairment Scale (DSIS) Methodology according to the specification ITU-R 500-11 (Subjective Television Picture Assessment Standard);
  Obtaining the expression for the unknown Sm0 function in terms of CFR and Usmooth using the model for user satisfaction on motion smoothness where the CFR is less than the value of FR (CBR, DPC);
  Obtaining the values of sm0 by evaluating the expression obtained for Sm0 in the previous step, for CFR and Usmooth values; and
  Obtaining the sm0 function in terms of CBR and DPC by least squares fitting using CBR, DPC and the sm0 values obtained in the previous step.

11. The method according to claim 8, wherein obtaining $Sm_1$ function comprises the steps of
  Obtaining Usmooth values as the result of subjective tests performed for different values of CBR, CFR with the Double Stimulus Impairment Scale (DSIS) Methodology according to the specification ITU-R 500-11 (Subjective Television Picture Assessment Standard);
  Obtaining the expression for the unknown $Sm_1$ function in terms of FR (CBR, DPC), CFR, $Sm_0$ and Usmooth using the model for user satisfaction on motion smoothness where the CFR is more than the value of FR (CBR, DPC);
  Obtaining the values of $Sm_1$ by evaluating the expression obtained for $Sm_0$ in the previous step, for FR (CBR, DPC), CFR, $Sm_0$ and Usmooth values; and
  Obtaining the $Sm_1$ function in terms of CBR and DPC by least squares fitting using CBR, DPC and the $Sm_1$ values obtained in the previous step.

12. The method according to claim 8, wherein said FR (CBR, DPC) function contains a polynomial expression of degree at least two.

13. The method according to claim 8, wherein said FR (CBR, DPC) function contains an exponential expression.

14. The method according to claim 8, wherein said $Sm_0$ function contains a polynomial expression of degree at least two.

$Usmooth(CFR, CBR, DPC) =$ $$\begin{cases} 1 - e^{-sm_0(CBR,DPC) \times CFR} & , CFR \leq FR(CBR, DPC) \\ (1 - e^{-sm_0(CBR,DPC) \times FR(CBR,DPC)}) \times e^{-sm_1(CBR,DPC) \times (CFR - FR(CBR,DPC))} & , CFR > FR(CBR, DPC). \end{cases}$$

15. The method according to claim 8, wherein said $Sm_0$ function contains an exponential expression.

16. The method according to claim 8, wherein said $Sm_1$ function contains a polynomial expression of degree at least two.

17. The method according to claim 8, wherein said $Sm_1$ function contains an exponential expression.

18. A method for determining the video coding parameters that will maximize the subjective user satisfaction, comprising the steps of:

Using the processing capability and the screen size of the client terminal, the communication channel capacity and the user preferences to determine the frame rate, bit rate, and the spatial resolution of a video that will result in maximum subjective user satisfaction, Encoding the video with the determined parameters and sending the video to the client terminal and said method is characterized in that said method decomposing the user satisfaction into three satisfaction models as the user satisfaction on crispness, the user satisfaction on motion smoothness and the user satisfaction on content visibility;

said user satisfaction on crispness is modeled as a function of encoded bits per pixel which is obtained by dividing the bit rate to the multiplication of the frame rate and the spatial resolution;

said user satisfaction on motion smoothness is modeled as a function of video coded bit rate (CBR), coded frame rate (CFR) and the processing capacity of the user terminal (DPC);

said user satisfaction on content visibility is modeled as a function of the video resolution in pixels (CSR) and the screen size of the user terminal (Screen Size) and wherein said user satisfaction on content visibility is modeled as a utility function using the coded frame rate (CFR), the Screen Size s constant and $s_1$, $s_2$ functions, and the utility function being formulated as, $$U_{cv}(CSR, ScreenSize) = \begin{cases} 1 - e^{-s_1(CSR) \times CSR} & CSR \leq ScreenSize \\ se^{-s_2(CSR) \times (CSR - ScreenSize)} & CSR > ScreenSize. \end{cases}$$

19. The method according to claim 18, wherein obtaining $s_1$ function comprises the steps of, Obtaining Ucv values as the result of subjective tests performed for different values of CSR, and the Screen Size with the Double Stimulus Impairment Scale (DSIS) Methodology according to the specification ITU-R 500-11 (Subjective Television Picture Assessment Standard);

Obtaining the expression for the unknown s1 function in terms of CSR and Ucv using the model for user satisfaction on content visibility;

Obtaining the values of s1 by evaluating the expression obtained for so in the previous step, for the CSR values smaller than the Screen Size and Ucv values; and Obtaining the s1 function in terms of CSR by least squares fitting using CSR, and the s1 values obtained in the previous step.

20. The method according to claim 18, wherein constant s is obtained by evaluating the $s_1$ expression for the constant terminal screen size as given by $$s = 1 - e^{-s_1(ScreenSize) \times ScreenSize}.$$

21. The method according to claim 18, wherein obtaining $s_2$ function comprises the steps of, Obtaining $U_{cv}$ values as the result of subjective tests performed for different values of CSR, and the Screen Size with the Double Stimulus Impairment Scale (DSIS) Methodology according to the specification ITU-R 500-11 (Subjective Television Picture Assessment Standard);

Obtaining the expression for the unknown $s_2$ function in terms of CSR, the Screen Size, the constant s and, $U_{cv}$ using the model for user satisfaction on content visibility;

Obtaining the values of $s_2$ by evaluating the expression obtained for $s_2$ in the previous step, for the CSR values larger than the Screen Size, the Screen Size, the constant s and $U_{cv}$ values; and Obtaining the $s_2$ function in terms of CSR by least squares fitting using the CSR, and the $s_2$ values obtained in the previous step.

22. The method according to claim 18, wherein said $s_1$ function contains a polynomial expression of degree at least two.

23. The method according to claim 18, wherein said $s_1$ function contains an exponential expression.

24. The method according to claim 18, wherein said $s_2$ function contains a polynomial expression of degree at least two.

25. The method according to claim 18, wherein said $s_2$ function contains an exponential expression.

26. A method for determining the video coding parameters that will maximize the subjective user satisfaction, comprising the steps of:

Using the processing capability and the screen size of the client terminal, the communication channel capacity and the user preferences to determine the frame rate, bit rate, and the spatial resolution of a video that will result in maximum subjective user satisfaction, Encoding the video with the determined parameters and sending the video to the client terminal and said method is characterized in that said method decomposing the user satisfaction into three satisfaction models as the user satisfaction on crispness, the user satisfaction on motion smoothness and the user satisfaction on content visibility;

said user satisfaction on crispness is modeled as a function of encoded bits per pixel which is obtained by dividing the bit rate to the multiplication of the frame rate and the spatial resolution;

said user satisfaction on motion smoothness is modeled as a function of video coded bit rate (CBR), coded frame rate (CFR) and the processing capacity of the user terminal (DPC);

said user satisfaction on content visibility is modeled as a function of the video resolution in pixels (CSR) and the screen size of the user terminal (Screen Size) and further comprises the steps:

For obtaining the Pareto optimal set:
Calculation of the values of the utility functions of crispness, motion smoothness, content visibility for all possible values of (CFR, CFR, CSR), that is obtaining a ($U_{crisp}$, $U_{smooth}$, $U_{cv}$) vector for each corresponding (CFR, CFR, CSR) vector, Determining the Pareto optimal solution set as a subset of the set of ($U_{crisp}$, $U_{smooth}$, $U_{cv}$) vectors obtained in the previous step by discarding the ($U_{crisp}$, $U_{smooth}$, $U_{cv}$) vectors having all three of its components less than other vectors in the set, For discarding the solutions exceeding the channel capacity:
Removing the members of the pareto optimal set for which the corresponding CBR values are larger than the communication channel capacity, in order to obtain a reduced solution set whose members can be transmitted through the channel,
Selection of a crispness coefficient having a value between 0 and 1 for the utility of crispness preferably by the end user,
Selection of a motion smoothness coefficient having a value between 0 and 1 for the utility of motion smoothness preferably by the end user,
Selection of a content visibility coefficient having a value between 0 and 1 for the utility of content visibility preferably by the end user,
The normalization of the selected crispness, motion smoothness and content visibility coefficients to make them sum up to unity obtaining the normalized crispness, normalized motion smoothness, normalized content visibility coefficients,
Obtaining a subjective utility value for each member ($U_{crisp}$, $U_{smooth}$, $U_{cv}$) of the reduced solution set by summing the multiplication of the normalized crispness coefficient with $U_{crisp}$, the multiplication of the normalized motion smoothness coefficient with $U_{smooth}$ and the multiplication of the normalized content visibility coefficient with $U_{cv}$,
Determining the ($U_{crisp}$, $U_{smooth}$, $U_{cv}$) vector that corresponds to the highest utility value obtained in the previous step, and
Coding the video that will be sent to the user terminal with the parameters (CBR, CFR, CSR) corresponding to the ($U_{crisp}$, $U_{smooth}$, $U_{cv}$) vector obtained in the previous step.

* * * * *